Patented Nov. 12, 1929

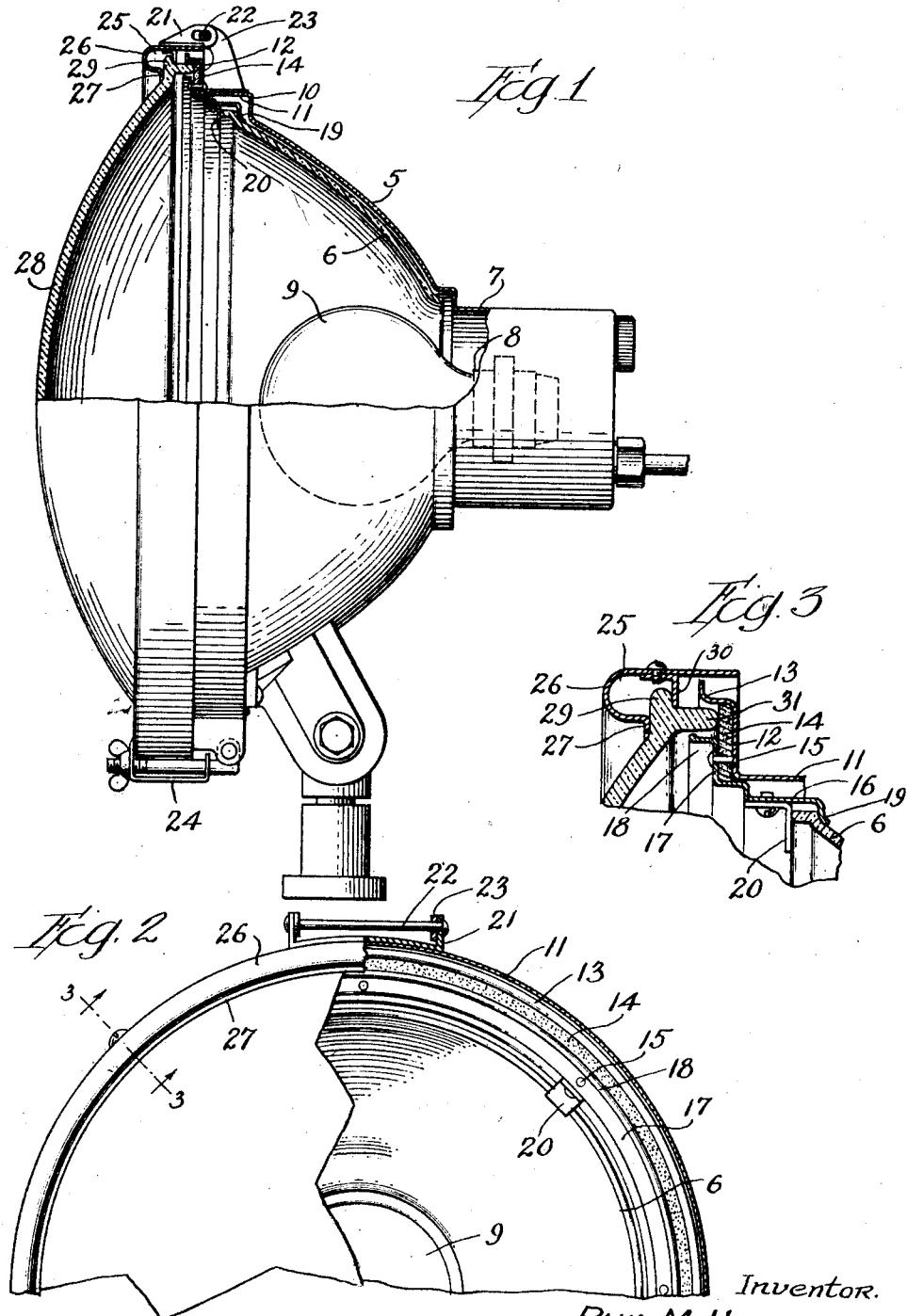

1,735,248

UNITED STATES PATENT OFFICE

PAUL M. HOTCHKIN, OF CHICAGO, ILLINOIS

CLOSURE FOR FLOODLIGHT PROJECTORS

Application filed April 28, 1927. Serial No. 187,282.

My present invention relates generically to illuminating projectors of the flood-light type, and has reference more particularly to the specific construction of the closure or door for the front of the housing or casing.

With my present structure I have been able to provide a projector housing with a closure or door wherein the frame of the door is very simply and economically constructed, and the lens or front glass is provided with means that will seat on a gasket mounted on the front of the housing or casing so as to effectively seal the joint between these parts and thereby render the device highly weatherproof. The seat for the gasket is of novel construction and is arranged so that the gasket and the coacting portion of the lens or front glass perform their function in a dependable and effective manner. The coacting edge of the lens is also of novel shape and is seated in a positive manner upon the gasket so that there is little or no liability of leakage and the like. Provision is also made upon the edge of the lens for securing the same in the door frame.

Numerous objects are contemplated in my present device, among which are the provision of a projector housing and closure that is simple, novel and durable in construction, dependable in operation, easy to manipulate, effective in performing its functions and is economical to manufacture so that it may be sold for a reasonable or moderate price.

I prefer to carry out my invention, and to accomplish the several objects thereof, in substantially the manner hereinafter fully described and as fully pointed out in the claims, reference being now made to accompanying drawings that form a part of this specification.

In the drawings:

Figure 1 is a view, partly in vertical section and partly in side elevation, of my improved flood-light projector and closure.

Figure 2 is a front elevation of a fragmentary portion or upper half of the structure shown in Figure 1 the right-hand portion thereof having the lens removed for clearness.

Figure 3 is a transverse section on line 3—3 of Figure 2.

The drawings are in a sense merely schematic and illustrate a typical or preferred embodiment of my invention, and in the drawings I have employed the same reference characters to designate like parts wherever they appear throughout the several views.

The casing or housing 5 is preferably formed from sheet metal of a shape somewhat like a truncated cone so as to conform generally to the shape of the light projecting reflector 6 contained therein, and its rear portion 7 is in the form of a cylindrical embossment for enclosing a suitable electric socket 8 for the lamp 9. Near its outer edge the housing 5 has a radial flange 10 from the outer edge from which there is extended a cylindrical annular portion 11 preferably concentric with the axis of the housing 5. An annular rim, of substantially L-shape section projects radially from the edge of the portion 11 that is farthest from the flange 10. The upright portion 12 of the rim is preferably at a right angle to the part 11 heretofore described, while the lateral portion 13 of said rim is at an angle to the upright portion 12. This rim provides an annular seat for a ring gasket 14 which may be of rubber, cork or any other suitable material that will permit of its compression when engaged by the sealing element of the door or closure, and said gasket is secured to the seat by means of rivets 15 that pass through the portion 12 of the rim and through the gasket near its inner edge. In order to mount the reflector 6, I have provided an annular carrier 16 that is of irregular shape in cross-section and has a flange 17 to fit against the front surface of gasket 14. This carrier is secured in position by the same rivets 15, that secure the gasket to its seat, and outside of or beyond the rivets there is a laterally extending lip 18 the purpose of which will hereinafter more fully appear. The inner edge of the reflector holder has an annular internal lip 19 against which the reflector rests and suitable angular or L-shaped clips retain the reflector in position upon the holder.

The closure for the front of the structure above described is in the form of a circular door the upper segment of which is provided with a hinge element 21 that coacts, by means of a pin and slot connection 22, with the other element 23 that is mounted upon the cylindrical annular portion 11 of the housing, and diametrically opposite the hinge structure the door and housing are provided with the respective elements of a compression lock or latch 24. The door structure consists of an outer frame formed from sheet metal, the body portion 25 of which is preferably cylindrical and is of sufficient dimensions to have its rear edge positioned in the plane of the portion 12 of the rim. The opposite or outer edge portion of the frame is in cross-section in the form of a compound or ogee curve, the outer curve 26 of which forms a semi-circular bead while the remaining portion curves inwardly as at 27 towards the center of the frame to engage the lens. This frame of the door provides means for mounting a lens 28 that is of concavo-convex section, bulged outwardly and fabricated preferably from heat-resisting glass. The periphery or edge of the lens is formed preferably in the shape of an L-shaped flange with the angular corner at the edge of the lens, the short member 29 of the flange being disposed at an oblique angle to the adjacent portion of the lens and at right angle to the axis of the projector structure so as to provide a bead to be engaged by the L-shaped or angular retainers 30 that are secured to the cylindrical or body portion 25 of the door frame and project radially inward therefrom. Thus the bead is positioned between the inwardly curved portion 27 of the frame and the retainers 30 and may be readily removed and a new lens replaced whenever desired. The longer member 31 of the L-shaped flange of the lens projects at substantially a right angle to the bead 29 and it is adapted, when the door is closed and clamped by the latch bolt, to press into the gasket 14 and seal the front opening of the housing. It will be noted the member 31 engages the exposed portion of the gasket between the lateral portion of the rim and the lip 18 of the reflector holder so that the foreign matter as well as the atmospheric elements are successfully excluded from the interior of the projector.

What I claim is:—

1. A flood-light projector comprising a concave body terminating at its rim in a lateral flange, an annulus of angular section secured to said body with a lateral portion extending adjacent said flange, a gasket interposed between said flange and the lateral portion of said annulus and having a portion extended beyond the annulus, and a closure consisting of an annular door-frame coacting with said body, a lens carried by the door frame, and a rib projecting laterally from the closure into engagement with said gasket whereby to seal the closure to the body.

2. A flood-light projector comprising a concave body terminating at its rim in a lateral flange, an annulus of angular section secured to said body with a lateral portion extending parallel to and spaced from said flange to provide a channeled open seat, a gasket positioned in said seat with a portion extended beyond said annulus, and a closure consisting of an annular door-frame coacting with said body, a lens carried by the door-frame and a rib projecting laterally from the closure into the space between the annulus and flange for engagement with the extended portion of said gasket whereby to seal the closure to the body.

3. A flood-light projector comprising a concave body having an open front, a seat of substantially channel section formed around said open front, one of the lateral walls of the seat being narrower than the opposite lateral wall, a gasket disposed in said seat having its outer rim extended beyond the narrow wall of the seat, and a closure for said body consisting of an open frame mounted upon the open front of the body beyond said gasket, and a lens fitted into said frame and having a rib projecting into engagement with said gasket to seal the closure to the body.

4. A flood-light projector comprising a concave body having an open front, the edge of said body provided with an L-shaped rim one portion of which is lateral and the other portion is concentric to said body, an annulus adjacent said rim having an L-shaped flange one portion of which is lateral and the other portion of which is concentric thereto, said rim and said flange providing an open seat facing outwardly, a gasket disposed in said seat, a door frame hinged to said body and closing the front thereof, and a lens carried by said door frame and having a concentric rib that seats upon said gasket when said door frame is in a closed position.

Signed at Chicago, in the county of Cook and State of Illinois, this 9th day of April, 1927.

PAUL M. HOTCHKIN.